UNITED STATES PATENT OFFICE.

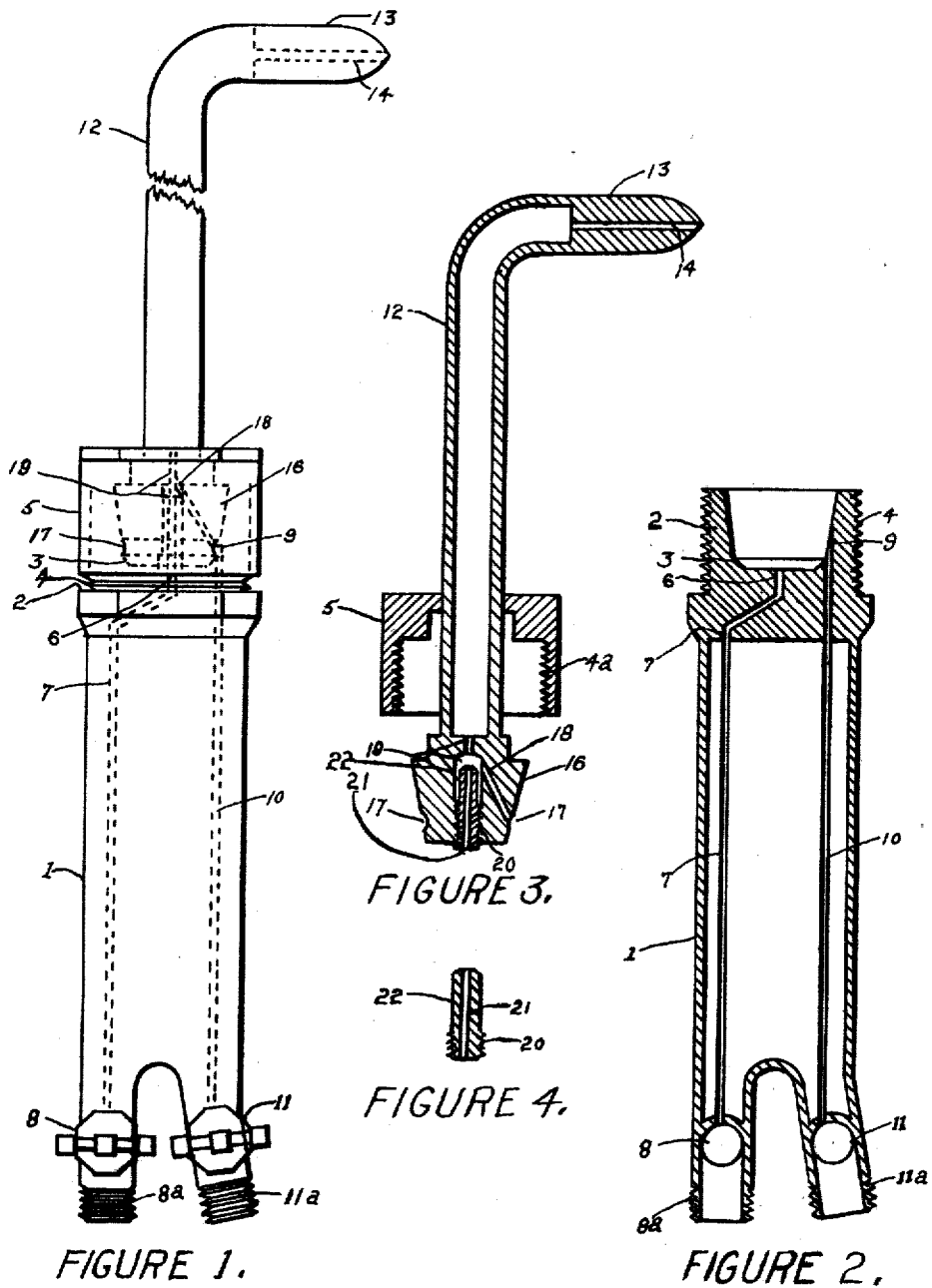

PAUL L. GEER, OF SAN JOSE, CALIFORNIA.

OXYGEN-ACETYLENE WELDING-TORCH.

1,236,833.

Specification of Letters Patent.

Patented Aug. 14, 1917.

Application filed June 12, 1916. Serial No. 103,232.

*To all whom it may concern:*

Be it known that I, PAUL L. GEER, a citizen of the United States, residing at San Jose, in the county of Santa Clara and State of California, have invented certain new and useful Improvements in Oxygen-Acetylene Welding-Torches, of which the following is a specification.

This invention relates to an improvement in adjusting means for oxygen acetylene welding torch, and particularly to a means for varying the mixture of oxygen and acetylene gas, with a view to maintaining the heating efficiency, and producing a neutral flame.

The main object of the present invention is to provide a welding torch that may be light and durable, and one in which the nozzle and tube is integral, and of various lengths, and bent in various ways as to the work required of the same, and one in which different nozzles may be used as to the work required, and one in which the different nozzles may be connected by hand without the use of a wrench.

This invention in the preferred form of details will be described in the following specification, reference being had to the accompanying drawings, in which:

Figure 1 is a side elevation of my oxygen acetylene welding torch assembled, showing valves, tubes, pipe connections, and torch nozzle stem with coupling nut in position, parts broken away.

Fig. 2 is a sectional view of my oxygen acetylene welding torch with needle valves and nozzle tube removed.

Fig. 3 is a detail sectional view of the nozzle tube and cone connection with nozzle coupling nut on said nozzle tube.

Fig. 4 is a detail view of the acetylene gas adjusting screw.

Referring to the drawings, 1 indicates a metal tube having a metal threaded portion 2 which is made an integral part of said tube 1, said threaded portion 2 having a coupling seat 3, and a threaded portion 4 on which is screwed nozzle tube coupling nut 5, by threads 4ª. At the bottom of said coupling seat 3 is shown needle opening 6, connecting with small metal pipe 7, the same leading back longitudinally through tube 1 to needle valve 8, through which the oxygen is admitted under pressure through hose pipe connection 8ª, and regulated by said needle valve 8, said pipe 7 and the casing of valve 8 being made an integral part of tube 1. At the side and a distance up from the bottom of said coupling seat 3, is a needle opening 9, connecting with small metal pipe 10, the same leading back longitudinally through tube 1 to needle valve 11, through which the acetylene gas is admitted under pressure through hose connection 11ª, and regulated by said valve 11, said pipe 10 and the casing of valve 11 being made an integral part of tube 1.

Metal nozzle tube is shown at 12, the tip 13 thereof being made solid and is an integral part of said nozzle tube 12 having a suitable opening as shown at 14, said tube 12 having a cone coupling 16 at the lower end thereof, said cone coupling 16 being made an integral part of nozzle tube 12; a groove 17 is cut in cone coupling 16, adapted to connect with needle opening 9 in coupling seat 3, from said groove 17 is a needle opening 18 connecting with longitudinal opening 19, in coupling 16, said opening 19 connecting with nozzle tube 12 through which the acetylene gas is admitted under pressure through pipe 10, said opening 19 being threaded to receive acetylene gas adjustable screw 20 therein, said screw 20 having a needle opening 21 longitudinally therethrough through which the oxygen is admitted to tube 12 under pressure, said adjustable screw 20 being adapted to regulate the amount of acetylene gas admitted to tube 12 through needle opening 18 by adjusting the unthreaded portion 22 of said adjustable screw 20 into opening 19 past opening 18, this not only regulates the amount of acetylene gas entering into tube 12, but causes a most thorough mixture of the oxygen and acetylene gas passing into tube 12. I do not wish to confine myself as to the length of nozzle tube 12 or as to the shape or bend of the same, as different lengths and different bends may be used for the unlimited work to which this welding torch is adapted.

Having thus described my invention, what I claim as new and desire to secure by Letters Patent is:

In an oxygen acetylene welding torch, the combination of a metal tube having a threaded metal portion which is an integral part thereof, a nozzle tube coupling nut, a coupling seat in said threaded portion, a needle opening through the side of said coupling seat, a metal nozzle tube the tip thereof being made solid having a suitable opening made therein, said metal nozzle tube having a cone coupling at the lower end thereof, a longitudinal threaded opening in said cone coupling, said cone coupling being an integral part of said nozzle tube, a groove cut in said cone coupling, adapted to connect with said needle opening in the side of said coupling seat, an opening in said cone coupling leading from said groove and connecting with the longitudinal opening leading to said nozzle tube through which acetylene gas is admitted to said nozzle tube under pressure, and an adjusting screw having a needle opening longitudinally therethrough adapted to deliver the oxygen through said needle opening to said nozzle tube under pressure, and to regulate and mix the oxygen and acetylene gas passing into said nozzle tube, substantially as and for the purpose described.

In testimony whereof I have hereunto affixed my signature in the presence of two witnesses.

PAUL L. GEER.

Witnesses:
C. E. Lodge,
E. L. Erwin.

Copies of this patent may be obtained for five cents each, by addressing the "Commissioner of Patents, Washington, D. C."